(12) United States Patent
Da Silva

(10) Patent No.: US 7,505,931 B2
(45) Date of Patent: Mar. 17, 2009

(54) METHOD AND SYSTEM FOR MONITORING TRANSACTIONS

(75) Inventor: Simon Da Silva, Hampstead (GB)

(73) Assignee: Standard Chartered (CT) PLC, London (GB)

( * ) Notice: Subject to any disclaimer, the term of this patent is extended or adjusted under 35 U.S.C. 154(b) by 449 days.

(21) Appl. No.: 10/378,465

(22) Filed: Mar. 3, 2003

(65) Prior Publication Data

US 2004/0177035 A1 Sep. 9, 2004

(51) Int. Cl.
G06Q 40/00 (2006.01)

(52) U.S. Cl. ....................................... 705/35
(58) Field of Classification Search .................. 705/35, 705/42
See application file for complete search history.

(56) References Cited

U.S. PATENT DOCUMENTS

| | | |
|---|---|---|
| 4,774,663 A | 9/1988 | Musmanno et al. |
| 4,994,964 A | 2/1991 | Wolfberg et al. |
| 5,210,687 A | 5/1993 | Wolfberg et al. |
| 5,420,405 A | 5/1995 | Chasek |
| 5,457,305 A | 10/1995 | Akel et al. |
| 5,615,110 A | 3/1997 | Wong |
| 5,627,886 A | 5/1997 | Bowman |
| 5,724,488 A | 3/1998 | Prezioso |
| 5,790,645 A | 8/1998 | Fawcett et al. |
| 5,794,178 A | 8/1998 | Caid et al. |
| 5,819,226 A | 10/1998 | Gopinathan et al. |
| 5,822,741 A | 10/1998 | Fischthal |
| 5,842,185 A | 11/1998 | Chancey et al. |
| 5,872,844 A | 2/1999 | Yacobi |
| 5,884,289 A | 3/1999 | Anderson et al. |
| 5,889,862 A | 3/1999 | Ohta et al. |
| 5,901,229 A | 5/1999 | Fujisaki et al. |
| 5,913,203 A | 6/1999 | Wong et al. |
| 5,924,084 A | 7/1999 | De Rooij |
| 5,963,648 A * | 10/1999 | Rosen .......................... 705/67 |
| 5,963,922 A | 10/1999 | Helmering |
| 6,016,480 A | 1/2000 | Houvener et al. |
| 6,016,482 A | 1/2000 | Molinari et al. |
| 6,035,295 A | 3/2000 | Klein |
| 6,047,174 A | 4/2000 | Frederick |

(Continued)

FOREIGN PATENT DOCUMENTS

WO WO 97/00483 * 1/1997

OTHER PUBLICATIONS

Cox M., "MasterCard Offers Early Fraud Alert System: Series 5", American Banker (pre-1997) New York, N.Y: May 24, 1989, vol. 154, Iss. 101; p. 2.*

Primary Examiner—Hani Kazimi
(74) Attorney, Agent, or Firm—Snell & Wilmer L.L.P.

(57) ABSTRACT

A method for monitoring financial accounts to determine the possibility of money laundering and other attempts at fraud includes monitoring the financial accounts owned by a person or entity. Data regarding withdrawals and deposits are extracted from a computer database and analyzed. The analysis includes determining the amount of time between a large deposit and the withdrawal (in one or more transactions) of a large portion of the deposit. A further analysis may include determining the amount of time between a large withdrawal and the time of the earliest deposit, wherein multiple deposits may be combined. Using the above-described data, accounts that are more likely to be used for money laundering and other fraudulent activities.

18 Claims, 2 Drawing Sheets

U.S. PATENT DOCUMENTS

| | | |
|---|---|---|
| 6,072,894 A | 6/2000 | Payne |
| 6,128,602 A * | 10/2000 | Northington et al. .......... 705/35 |
| 6,154,731 A | 11/2000 | Monks et al. |
| 6,188,753 B1 | 2/2001 | Afsar et al. |
| 6,253,186 B1 | 6/2001 | Pendleton, Jr. |
| 6,254,000 B1 | 7/2001 | Degen et al. |
| 6,263,335 B1 | 7/2001 | Paik et al. |
| 6,266,664 B1 | 7/2001 | Russell-Falla et al. |
| 6,307,926 B1 | 10/2001 | Barton et al. |
| 6,324,523 B1 | 11/2001 | Killeen, Jr. et al. |
| 6,330,546 B1 | 12/2001 | Gopinathan et al. |
| 6,402,027 B1 | 6/2002 | Sasaki |
| 6,418,436 B1 | 7/2002 | Degen et al. |
| 6,430,274 B1 | 8/2002 | Winstead et al. |
| 6,430,305 B1 | 8/2002 | Decker |
| 6,442,533 B1 * | 8/2002 | Hinkle ..................... 705/36 R |
| 2001/0034635 A1 | 10/2001 | Winters |
| 2002/0069084 A1 | 6/2002 | Donovan |
| 2002/0133371 A1 * | 9/2002 | Cole ........................... 705/1 |
| 2002/0138417 A1 | 9/2002 | Lawrence |
| 2003/0033228 A1 * | 2/2003 | Bosworth-Davies et al. .. 705/35 |

* cited by examiner

METHOD AND SYSTEM FOR MONITORING TRANSACTIONS

FIELD OF INVENTION

This invention is generally directed to a system for monitoring and reviewing accounts, and more particularly, to a method and system for monitoring financial transactions to detect fraud, money laundering, and other suspicious or illegal activities.

BACKGROUND OF THE INVENTION

In the financial industry, funds are often separated into different accounts wherein each account is a uniquely identifiable construct wherein funds can be segregated from other funds. An account is generally associated with a person or entity and can be used to invest money or to place the money in a relatively safe place. A person or entity may be assigned more than one account such that, for example, the person or entity may be assigned both a regular account and a retirement account with a single brokerage, bank, or other financial entity. Furthermore, the person or entity may be assigned a checking account, a savings account, and a line of credit at a financial institution.

Funds may be placed into an account through the use of "deposits," wherein deposits may be accomplished in a variety of ways, such as through the use of a check, wire transfer, debit card transaction and/or the like. After finds are placed into an account through the use of a deposit, various actions can be performed on the funds. For example, in an account held in a brokerage, the funds can be used to purchase financial securities, such as stocks and/or bonds. Money may be removed from an account through the use of a "withdrawal," wherein withdrawals may include a cash withdrawal, money order, cashier's check, wire transfer, domestic transfer, debit card transaction, and/or the like.

A single entity may own multiple accounts, so a "transfer" may occur when money from one account is moved to another account owned by the same entity. Transfers are also possible between accounts with different owners; however, in such a situation, it may be more appropriate to categorize the transfer as a deposit for the receiving party and as a withdrawal for the sending party because the funds are typically no longer available to the sending party.

Certain people may use banks, brokerages, and other financial institutions in an attempt to conceal or commit criminal activities. For example, money laundering is usually the process by which an attempt is made to conceal the origin of ill-gotten funds, through the use of various otherwise legitimate activities. In a typical scenario, illegally obtained funds may be processed through a brokerage account, bank account, or the like in such a way that, by depositing the money into an account and withdrawing it at a later time, the origin of the funds may be more difficult to determine. In addition, a criminal may attempt to use a financial account to commit fraud on various entities. An example of debit card fraud is where one uses stolen debit cards or stolen details of debit cards (e.g., account number, expiration date, etc.) to fund multiple deposits into their account and then withdraws the proceeds via some other mechanism, such as check, domestic transfer, or wire transfer. By tracking the deposit and withdrawal behavior, these types of fraudulent activities can be identified. In general, a person or entity attempting to launder money or otherwise conceal or commit fraud does not transfer money between accounts owned by the same entity, but rather deposits money and later withdraws the money from the same account. Thus, deposits and withdrawals are of great interest to those investigating potential financial fraud.

It is often desirable for financial institutions to monitor accounts in an attempt to detect fraud, money laundering, and other suspicious activities, in order to prevent illegal activities and to aid law enforcement in identifying previous illegal activities.

SUMMARY OF THE INVENTION

A method for monitoring financial accounts to determine the possibility of money laundering and other attempts at fraud includes monitoring the financial accounts owned by a person or entity, extracting data regarding withdrawals and deposits from the accounts owned by that person or entity from a computer database and analyzing the data. The extracted data may include the type, amount, and date of each transaction. The analysis may comprise determining the amount of time between a large deposit and the withdrawal (in one or more transactions) of a large portion of that deposit, such as, for example, 90% of the deposit. The data is then combined by, for example, using a quotient of the two values to calculate a constant, where a lower constant is more indicative of suspicious behavior.

A further analysis may include determining the amount of time between a large withdrawal and the time of the earliest deposit, wherein multiple deposits may be combined in such an analysis. The data is then combined by, for example, using a quotient of the two values to calculate a constant, where a lower constant is more indicative of suspicious behavior.

A system for monitoring financial accounts includes a computer system configured to access various financial data, storage for various financial data, a database program configured to find and extract certain pieces of financial data, and output capabilities to transmit the results in a variety of different manners.

BRIEF DESCRIPTION OF THE DRAWING

A more complete understanding of the present invention may be derived by referring to the detailed description and claims when considered in connection with the Figure, where:

DETAILED DESCRIPTION

Figure 1:
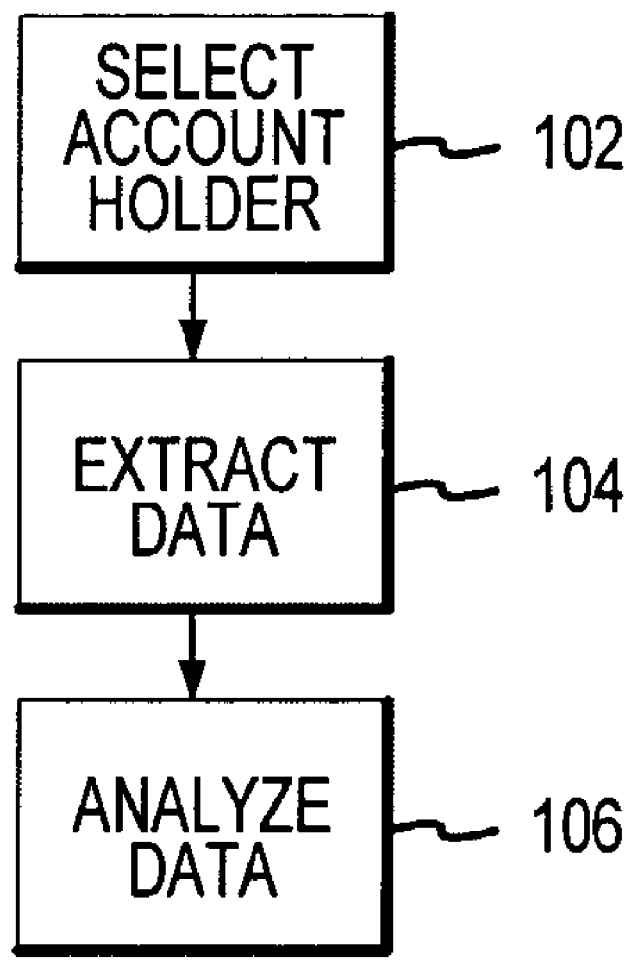
FIG. 1 is a flow chart showing an exemplary method in accordance with the present invention.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

An embodiment of the present invention operates by examining the transaction history (e.g., withdrawals, deposits, transfers, and the like) of an account holder. As used herein, "account holder" includes any person, family, group, business, organization, entity, device, account, software and/or hardware associated with an account. The "account" may include any database record, financial ledger and/or other record. The account may include electronic records, databases and/or physical items of monetary amounts, various types of currency, loyalty points, precious metals, commodities, stocks, bonds, memberships and/or the like. The account may be further allocated to one or more account holders and may be associated with an account number. An "account number," as used herein, includes any device, code, number, letter, symbol, biometric or other identifier/indicia suitably configured to allow the account holder to interact or communicate with the account, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device.

The databases discussed herein may be any type of database, such as relational, hierarchical, object-oriented, and/or the like. Common database products that may be used to implement the databases include DB2 by IBM (White Plains, N.Y.), any of the various database products available from Oracle Corporation (Redwood Shores, Calif.), Microsoft Access or Microsoft SQL Server by Microsoft Corporation (Redmond, Wash.), the open source MySQL database product, or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In general, information regarding transactions on an account is stored for a predetermined period of time. In one embodiment, the information ("transaction history") is stored in a database accessible by various computer means. The transaction history of a particular account holder is searched by one or more of a variety of different methods and the results are examined. The portions of the transaction history that may be examined include the type of transaction (e.g., withdrawals, deposits, transfers, and the like), the date of the transaction, and the amount of the transaction. The transaction history is then separated into withdrawals and deposits.

Figure 2:
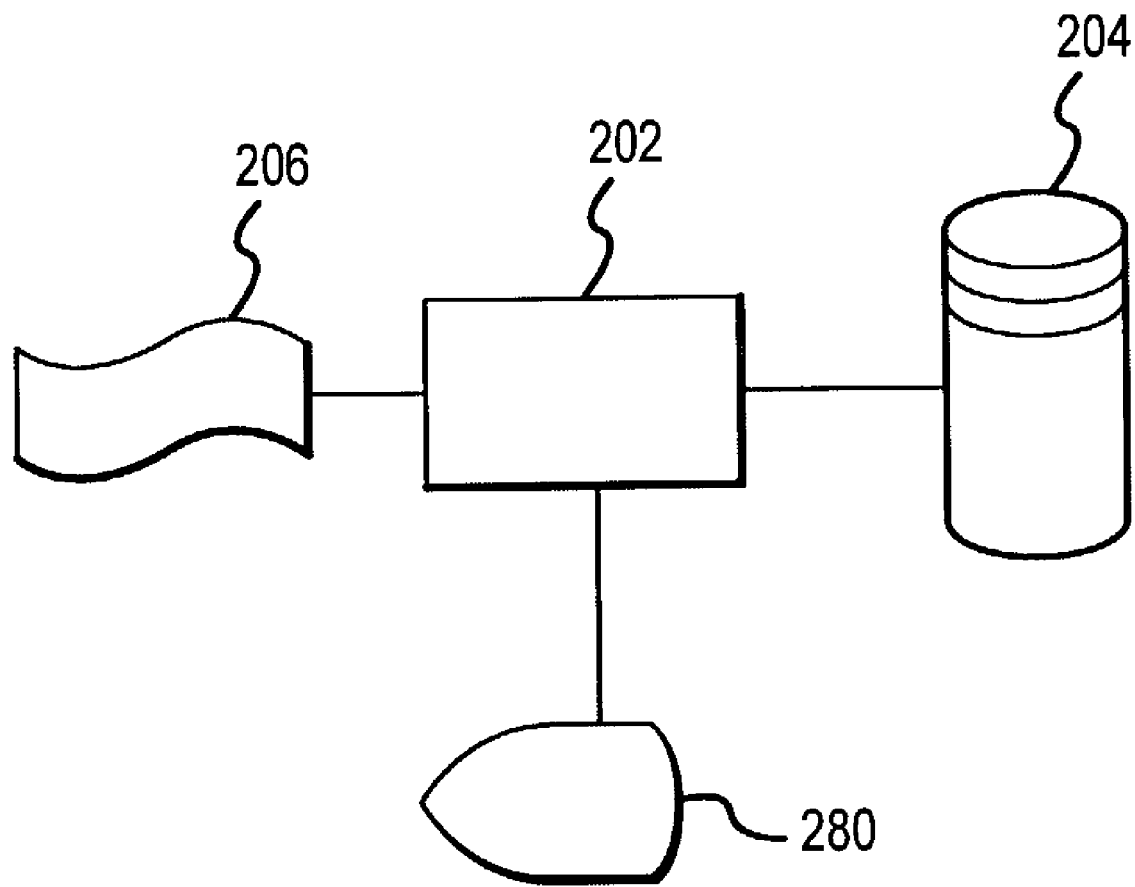
FIG. 2 is a block diagram showing a system of the present invention.

With reference to FIG. 2, a block diagram showing a system incorporating an embodiment of the present invention is presented. A computer system 202 is coupled to storage unit 204, where storage unit 204 contains the transaction history. The transaction history stored in storage unit 204 is typically in the form of a database. A software program 206 is configured to be loaded onto computer system 202. Thereafter, software program 206 can perform the various searches and calculations on the data contained in storage unit 204. Computer system 202 displays results on a video display unit 208. In the alternative, computer system 202 may output results via a printer or may route results electronically via, for example, the Internet.

With reference to FIG. 1, a review of the deposits may operate in the following manner. An account holder is selected (step 102). In one embodiment, the application code is stored as a program that has direct access to the database containing the stored transactions. Another embodiment may involve the use of a secure message transfer to receive the transaction data and account history from a separately stored database. The secure message transfer may take place via, for example, secure hypertext transfer protocol ("HTTPS"). The account may be selected by a variety of different criteria, limited only by the amount of data stored with respect to the account. In one embodiment, all accounts at a particular institution may be eligible for selection. In another embodiment, a subset of all accounts may be selected in one of a variety of different manners. For example, only customers meeting a specific condition, such as having a mailing address in a certain location, or investment in certain equities, may be queried.

Information regarding the transactions, both withdrawals and deposits, related to the accounts owned by the selected account holder are extracted, including information regarding the type of transaction, the date of the transaction, and the amount of the transaction (step 104). In one embodiment, the data is extracted through the use of various types of SQL statements performed on the appropriate tables. An embodiment of the present invention may be software that is stored in a manner such that it can access the financial information stored in the various tables. The SQL queries can be configured to include or exclude any transaction type. In certain embodiments, a subset of the transaction history of an account may be used. For example, only a predetermined number of transactions may be examined. In another embodiment, transactions within a predetermined time period may be examined. In another embodiment, transactions within a specific statement narrative may be examined. In another embodiment, transactions under, over, equal to, or between predetermined threshold amounts may be examined. After obtaining the desired subset of data, various calculations are performed on the extracted transaction information (step 106).

The present invention includes various embodiments for performing the calculations. For example, the number of days between the deposit of an amount and the withdrawal of 90% of the reviewed deposit may be used to calculate a constant, wherein the value of the constant is equal to the quotient of the number of days to withdraw 90% of a particular deposit and the amount of the deposit:

Constant=(# of days to withdraw 90% of deposit÷amount of deposit)

For example, customer A deposits 10,000 on Feb. 2, 2002, but customer A withdraws 4,000 on May 5, 2002 and withdraws 5,200 on Jun. 25, 2002. Thus, there is a total of 143 days between the time 10,000 is deposited and the time at least 90% of the deposited amount (i.e., 9,000) is withdrawn. The constant would thus be equal to 0.0143.

In contrast, customer B deposits 62,000 on Apr. 4, 2002, but then on May 15, 2002, customer B withdraws the entire amount. The constant would thus be (40/62,000) or 0.0006452, which is much lower than the constant for customer A. Thus, the lower constant may be indicative of suspicious behavior as it indicates large portions of a deposit being withdrawn in a shorter timeframe. It should be understood that a percentage other than 90% may also be used.

After reviewing the analysis of deposits above, the following is a review of an analysis of the withdrawals. After the information regarding the accounts is extracted, in a manner similar to that described above in steps 102 and 104, a predetermined number of withdrawals (or all the withdrawals over a predetermined number of days) may be examined and various calculations may be performed on the withdrawal data. For example, the number of days for the prior deposit amounts to sum up to 90% of the selected withdrawal amount may be used to calculate a constant. In one embodiment, the value of the constant is equal to the quotient of the number of days since the first deposit, prior to the withdrawal, wherein the deposit amounts total 90% of the selected withdrawal amount, and the amount of the withdrawal:

Constant=(# of days since the first deposit that constitutes 90% of withdrawal amount÷amount of withdrawal)

For example, customer C makes the following transactions:

Feb. 15, 2002—deposit 2,000
Apr. 4, 2002—deposit 4,000
Aug. 22, 2002—withdraws 5,500

Thus, there are 188 days between the time customer C withdrew the money and the time of depositing the first amount constituting the aggregated deposit that exceeded 90% of the withdrawal, so the calculated constant is (188/5,500)=0.03418.

In another example, Customer D makes the following transactions:

Apr. 4, 2002—deposit 6,500
Apr. 5, 2002—deposit 8,000
Apr. 9, 2002—deposit 4,000
Apr. 17, 2002—withdraw 18,000

Thus, there are 13 days between the withdrawal of 18,000 and the first deposit and the constant is 13/18,000=0.0007222. This low constant may be indicative of suspicious behavior, as it is indicative that a withdrawal of a large portion of a deposit is being completed shortly after the deposit is completed.

The deposit review and withdrawal review may be similar in certain respects. In fact, in some instances, the different reviews may produce similar results. For example, customer B deposits 62,000 on Apr. 4, 2002, then withdraws the full amount 40 days later. The deposit review and the withdrawal review result in the same constant.

However, there is an important difference between the two methods. This is illustrated using the case of Customer D above—applying the deposit review algorithm to each deposit, the constants are 8/4,000=0.0020; 12/8,000=0.0015; 13/6,500=0.0020. While these constants are relatively low, if the withdrawal algorithm is used, the constant is much lower at 0.0007222.

Thus, one difference between the deposit review and the withdrawal review is that the deposit review method can identify a single large deposit followed by multiple withdrawals, while the withdrawal review method can identify multiple deposits followed by a single large withdrawal.

It should be understood that the constants described above may be inverted such that a higher number is indicative of suspicious behavior. Such a constant would then be the quotient of the amount of the deposit and the average number of days to withdraw 90% of a particular deposit. In the above examples, the constants would be (10,000/143)=69.93 and (62,000/40)=1,550, respectively, with higher constants being more indicative of suspicious behavior.

It should be understood that the review of deposits and withdrawals may use various forms of currency. Because the constant is related to the currency, it may be preferable to convert currency amounts to a single currency type before the calculations are performed such that, for example, transactions using British pounds are converted to US dollars prior to performing the calculations.

There are various possible configurations of the various reviews described above. The reviews may be run randomly or at predetermined, regular intervals such as, for example, daily, weekly, monthly, and/or the like. A financial institution may have a large number of accounts. Performing the above described method on every account may be too time intensive if performed every day on each account. Therefore, only a portion of the accounts may be examined each day. However, each account is still examined at a regular interval.

Moreover, the reviews may be configured to review transactions only over certain amounts because, for example, transactions with low constants, but low dollar amounts, may be of little interest to those monitoring the accounts. Furthermore, money laundering typically involves larger amounts of money. The reviews may also be configured to ignore certain transactions, such as, for example, exchanges between two accounts of a single entity. In addition, if a customer has multiple accounts, the behavior of both accounts may be monitored jointly, such that a deposit into one account and a withdrawal from another account can be both placed in the same calculation. Thus, if an entity deposits funds into account A, transfers the money into account B, then withdraws from account B, the above calculations will take place in the same manner as if only one account were being used.

In addition, once an account is flagged, past transactions may be analyzed to determine if there is a pattern to the transactions. Moreover, once an account is flagged, future transactions may be monitored more closely. For example, future transactions by the entity that owns the account may be monitored on a more regular basis, or transactions of different amounts may be viewed.

The reviews described above are typically performed by a computer system. Often, financial information is stored in a computer database. The reviews may be conducted by searching the database for transactions meeting the particular criteria specified above. Such a search may be accomplished through the use of a query performed in a variety of different manners. The results of the above search may be disseminated in a variety of different manners. For example, if suspicious account holders are found, various information about the account holder, such as the accounts owned and the transactions involved, may be transmitted to various people. Such a transmission may be in the form of an electronic mail (e-mail) message containing the relevant information to another party via a computer system, land phone, cellular phone, pager or any other wire or wireless network. In the alternative, the relevant information may be placed on a web site that is only accessible to certain, predetermined people, such as the FBI. When the web site is updated to contain information about account holders, a notice may be e-mailed to various people, informing them of the new information that has become available. The system may incorporate a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, PHP pages, plug-ins, and the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that other alternative or additional functional relationships or physical connections may be present in a practical electronic transaction system.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, a user computer will typically include an operating system (e.g., Windows NT, XP, 95/98/2000, Linux, Solaris, OS X, etc.) as well as various conventional support software and drivers typically associated with computers. A user computer can be in a home or business environment with access to a network. In an exemplary embodiment, access is through the Internet through a commercially-available web-browser software package.

The information obtained or derived by the present invention may also be distributed via any other distribution method and/or device such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

I claim:

1. A program storage device readable by a machine, tangibly embodying a program of instructions executable by a machine to perform the method steps for facilitating an audit of a financial transaction account wherein results of said audit are displayed on a display of said machine, said method steps comprising:

searching a database to find said financial transaction account;

identifying a withdrawal value associated with a withdrawal transaction, wherein said withdrawal value exceeds a withdrawal threshold value;

identifying a deposit value associated with a deposit transaction, wherein said deposit value is at least one of equal to and greater than a predetermined percentage of said withdrawal value;

determining a first constant by dividing a time period to withdraw a predetermined percentage of said withdrawal value by said withdrawal value;

analyzing said first constant to facilitate said audit when said first constant is at least one of equal to and greater than a constant threshold;

applying a marker to said financial transaction account when said first constant is a least one of equal to and greater than said constant threshold;

determining, by said marker, a second constant, which is indicative of at least one of a previous account transaction and a future account transaction;

determining if a pattern exists by comparing said second constant to said first constant; and, providing a notification of said pattern on said display of said machine.

2. The method of claim 1, wherein said identifying a withdrawal step comprises extracting at least one of a transaction identifier, said withdrawal value and a date of said withdrawal transaction.

3. The method of claim 1, wherein said identifying a deposit step comprises extracting at least one of a transaction identifier, said deposit value, and a date of said deposit transaction.

4. The method of claim 1, wherein said searching step further comprises selecting a subset of a plurality of financial transaction accounts according to predetermined criteria.

5. The method of claim 1, further comprising converting a first currency type associated with said withdrawal value to a second currency type.

6. The method of claim 1, wherein said analyzing step is performed in at least one of a random interval and a regular interval.

7. The method of claim 1, wherein said identifying a withdrawal step comprises selecting said withdrawal transaction based on a value of at least one of a deposit and a withdrawal.

8. The method of claim 1, wherein said searching step finds said financial transaction account by ignoring pre-defined transactions.

9. The method of claim 1, wherein said financial transaction account comprises multiple accounts associated with a single account holder.

10. The method of claim 1, wherein at least one of said withdrawal transaction and said deposit transaction comprises a plurality of past transactions, thereby enabling an analysis of a pattern within said past transactions.

11. The method of claim 1, further comprising transmitting results of said analyzing step to an account manager.

12. The method of claim 1, further comprising posting results of said analyzing step on an Internet web site.

13. The method of claim 1, wherein said deposit transaction occurs prior to said withdrawal transaction.

14. The method of claim 1, wherein said deposit transaction occurs subsequent to said withdrawal transaction.

15. The method of claim 1, wherein said analyzing step comprises formulating at least one of said first constant and said second constant by dividing said elapsed time by said withdrawal value.

16. A machine-readable medium having stored thereon a plurality of instructions, said plurality of instructions when executed by a processor, cause said processor to perform a method comprising the steps of:
    searching a database to find said financial transaction account;
    identifying a withdrawal value associated with a withdrawal transaction, wherein said withdrawal value exceeds a withdrawal threshold value;
    identifying a deposit value associated with a deposit transaction, wherein said deposit value is at least one of equal to and greater than a predetermined percentage of said withdrawal value;
    determining a first constant by dividing a time period to withdraw a predetermined percentage of said withdrawal value by said withdrawal value;
    analyzing said first constant to facilitate said audit when said first constant is at least one of equal to and greater than a constant threshold;
    applying a marker to said financial transaction account when said first constant is a least one of equal to and greater than said first constant threshold;
    determining, by said marker, a second constant, which is indicative of at least one of a previous account transaction and a future account transaction;
    determining if a pattern exists by comparing said second constant to said first constant; and,
    providing a notification of said pattern on a display of a machine.

17. A program storage device readable by a machine, tangibly embodying a program of instructions executable by a machine to perform the method steps for facilitating an audit of a financial transaction account wherein results of said audit are displayed on a display of said machine, said method steps comprising:
    searching a database to find said financial transaction account;
    identifying a withdrawal value associated with a withdrawal transaction, wherein said withdrawal value exceeds a withdrawal threshold value;
    identifying a deposit value associated with a deposit transaction, wherein said deposit value is at least one of equal to and greater than a predetermined percentage of said withdrawal value;
    determining a first constant by dividing a time period since a first deposit that constitutes a predetermined percentage of said withdrawal value by said withdrawal value;
    analyzing said first constant to facilitate said audit when said first constant is at least one of equal to and greater than a constant threshold;
    applying a marker to said financial transaction account when said first constant is a least one of equal to and greater than said constant threshold;
    determining, by said marker, a second constant, which is indicative of at least one of a previous account transaction and a future account transaction;
    determining if a pattern exists by comparing said second constant to said first constant; and,
    providing a notification of said pattern on said display of said machine.

18. A machine-readable medium having stored thereon a plurality of instructions, said plurality of instructions when executed by a processor, cause said processor to perform a method comprising the steps of:
    searching a database to find said financial transaction account;
    identifying a withdrawal value associated with a withdrawal transaction, wherein said withdrawal value exceeds a withdrawal threshold value;
    identifying a deposit value associated with a deposit transaction, wherein said deposit value is at least one of equal to and greater than a predetermined percentage of said withdrawal value;
    determining a first constant by dividing a time period since a first deposit that constitutes a predetermined percentage of said withdrawal value by said withdrawal value;
    analyzing said first constant to facilitate said audit when said first constant is at least one of equal to and greater than a constant threshold;
    applying a marker to said financial transaction account when said first constant is a least one of equal to and greater than said constant threshold;
    determining, by said marker, a second constant, which is indicative of at least one of a previous account transaction and a future account transaction;
    determining if a pattern exists by comparing said second constant to said first constant; and,
    providing a notification of said pattern on a display of a machine.

* * * * *